(12) United States Patent
Czapla et al.

(10) Patent No.: US 11,975,858 B2
(45) Date of Patent: May 7, 2024

(54) AIRCRAFT NACELLE COMPRISING A CONNECTION BETWEEN DUCTS COMPRISING FLANGES WHICH ARE ORIENTED TOWARDS THE INTERIOR, AND AIRCRAFT COMPRISING AT LEAST ONE NACELLE OF THIS TYPE

(71) Applicant: Airbus Operations SAS, Toulouse (FR)

(72) Inventors: Lionel Czapla, Toulouse (FR);
Frédéric Piard, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/971,680

(22) Filed: Oct. 24, 2022

(65) Prior Publication Data
US 2023/0132103 A1 Apr. 27, 2023

(30) Foreign Application Priority Data

Oct. 26, 2021 (FR) ........................................ 2111370

(51) Int. Cl.
*B64D 29/00* (2006.01)
(52) U.S. Cl.
CPC .................... *B64D 29/00* (2013.01)
(58) Field of Classification Search
CPC . B64D 29/00; B64D 2033/0206; F01D 25/24; F02K 1/827
See application file for complete search history.

(56) References Cited

U.S. PATENT DOCUMENTS

| | | | | |
|---|---|---|---|---|
| 6,857,669 B2* | 2/2005 | Porte | ..................... | F01D 25/243 285/368 |
| 8,231,332 B2* | 7/2012 | Vauchel | ................ | F04D 29/664 415/196 |
| 8,333,344 B2* | 12/2012 | Vauchel | ................ | B64D 29/08 244/1 N |
| 8,876,467 B2* | 11/2014 | Riou | ..................... | B64D 33/02 415/214.1 |

(Continued)

FOREIGN PATENT DOCUMENTS

| | | |
|---|---|---|
| FR | 2978731 A1 | 2/2013 |
| FR | 3057545 A1 | 4/2018 |
| WO | 2010001009 A2 | 1/2010 |

OTHER PUBLICATIONS

French Search Report dated Jun. 1, 2022; priority document.

*Primary Examiner* — Michael L Sehn
(74) *Attorney, Agent, or Firm* — Greer, Burns & Crain, Ltd.

(57) ABSTRACT

An aircraft nacelle comprising first and second ducts, each including, in a radial direction, at least one first or second acoustically resistive layer, at least one first or second alveolar structure, as well as a first or second reflective layer. The first and second ducts include first and second flanges which are positioned on transverse planes, oriented towards the interior, and are connected respectively to the first and second reflective layers and are maintained placed against one another by connection elements accessible from the interior of the first and second ducts. The first and second ducts are configured to form at least one receptacle in which there are positioned the first and second flanges as well as the connection elements, the receptacle being closed by at least one cap.

17 Claims, 4 Drawing Sheets

(56) References Cited

U.S. PATENT DOCUMENTS

| | | | |
|---|---|---|---|
| 9,803,547 B2* | 10/2017 | Porte | ................... B64D 33/02 |
| 2011/0147534 A1 | 6/2011 | Chelin et al. | |
| 2020/0002016 A1 | 1/2020 | Breton et al. | |

* cited by examiner

AIRCRAFT NACELLE COMPRISING A CONNECTION BETWEEN DUCTS COMPRISING FLANGES WHICH ARE ORIENTED TOWARDS THE INTERIOR, AND AIRCRAFT COMPRISING AT LEAST ONE NACELLE OF THIS TYPE

CROSS-REFERENCES TO RELATED APPLICATIONS

This application claims the benefit of the French patent application No. 2111370 filed on Oct. 26, 2021, the entire disclosures of which are incorporated herein by way of reference.

FIELD OF THE INVENTION

The present application relates to an aircraft nacelle comprising a connection between ducts comprising flanges which are oriented towards the interior, as well as to an aircraft comprising at least one nacelle of this type.

BACKGROUND OF THE INVENTION

Figure 1:
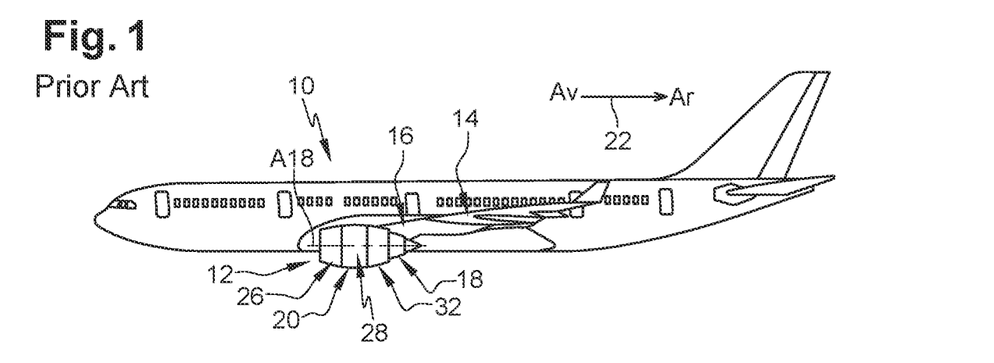
FIG. 1 is a lateral view of an aircraft.

According to an embodiment shown in FIG. 1, an aircraft 10 comprises a plurality of propulsion assemblies 12 which are positioned below the wings 14 of the aircraft 10, and are connected thereto by struts 16. Each propulsion assembly 12 comprises a turbojet engine 18 positioned in the interior of a nacelle 20.

In the continuation of the description, a longitudinal direction is parallel to the engine axis A18 of the turbojet engine 18, and a radial direction is perpendicular to the engine axis A18. A transverse plane is a plane perpendicular to the engine axis A18. The concepts of front/rear, indicated as Av/Ar, refer to the direction of flow of a flow of air 22 in the nacelle 20, this flow of air 22 flowing from the front (Av) towards the rear (Ar).

Figure 2:
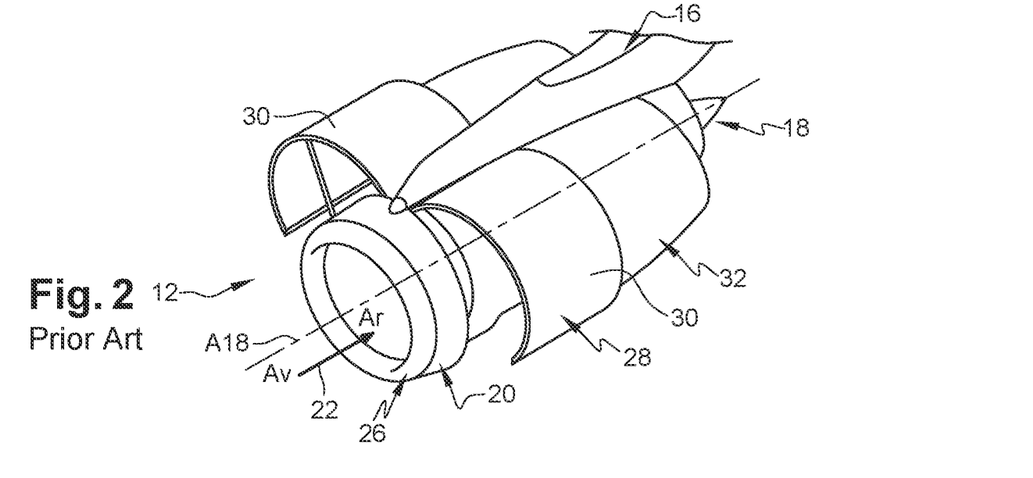
FIG. 2 is a view in perspective of a nacelle comprising cowls in the open position.

The nacelle 20 has an approximately tubular form, and delimits an annular duct 24 together with the turbojet engine 18. From the front towards the rear, it comprises a front part forming an air inlet 26, via which the flow of air 22 penetrates, and an intermediate part 28 comprising cowls 30 (shown in FIG. 2), as well as a rear part 32 via which the flow of air 22 exits, and which is generally provided with a thrust inversion system.

Figure 3:
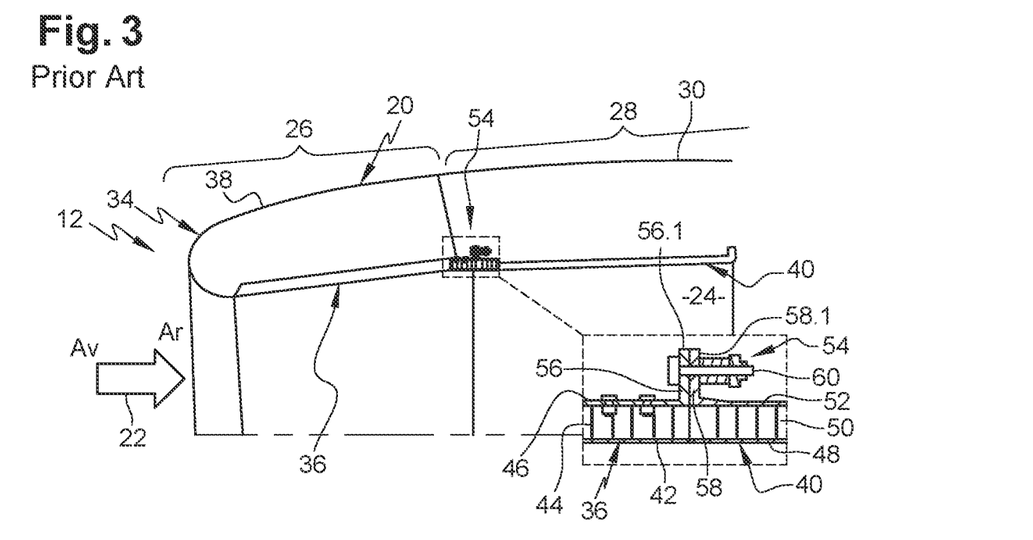
FIG. 3 is a longitudinal cross-section of part of a nacelle illustrating an embodiment of the prior art.

According to an embodiment shown in FIG. 3, the air inlet 26 comprises a lip 34, a first duct 36 extending the lip 34 towards the interior of the nacelle 20, as well as an exterior wall 38 extending the lip 34 towards the exterior of the nacelle 20 as far as the cowls 30.

The turbojet engine 18 comprises a fan. In parallel, the intermediate part 28 comprises a second duct 40, known as the fan case, forming a retention housing which is configured to retain the pieces of blades in the case of blade breakage, with the second duct 40 extending the first duct 36.

According to an embodiment shown in FIG. 3, the first duct 36 is delimited by acoustic panels juxtaposed over its entire circumference. In the radial direction, going away from the engine axis A18, each acoustic panel comprises a first acoustically resistive layer 42, at least one first alveolar structure 44, as well as a first reflective layer 46. Similarly, the second duct 40 is delimited by acoustic panels which, in the radial direction, going away from the engine axis A18, each comprise a second acoustically resistive layer 46, at least one second alveolar structure 50, as well as a second reflective layer 52.

The nacelle 20 comprises a connection 54 connecting the first and second ducts 36, 40 comprising a first flange 56 which is integral with the first reflective layer 46, a second flange 58 which is integral with the second reflective layer 52, placed against the first flange 56, as well as connection elements 60 maintaining the first and second flanges 56, 58 placed against one another.

The first and second flanges 56, 58 are oriented towards the exterior, and comprise free edges 56.1, 58.1 having diameters larger than those of the first and second reflective layers 46, 52.

This embodiment is not satisfactory, since it is necessary to provide cowls 30 which are movable at the intermediate part 28 of the nacelle 20, in order to access the connection element 60 from the exterior of the nacelle 20, by raising the cowls 30.

Document FR3057545 proposes a connection between the first and second ducts 36, 40 comprising connection elements which are oriented radially. Each of them has a nut which is inaccessible and blocked, as well as a screw which is screwed from the interior of the nacelle. According to this document, at least one acoustic panel delimiting the first or second duct 36, 40 comprises a recess to accommodate the head of the screw of each connection element, as well as at least one cap which is connected to the acoustic panel, and is flush with the acoustically resistive layer 42, 48 of the acoustic panel.

This solution is relatively complex to implement.

SUMMARY OF THE INVENTION

An objective of the present invention is to eliminate some or all of the disadvantages of the prior art.

For this purpose, a subject of the invention is an aircraft nacelle comprising first and second ducts, having first and second axes parallel to a longitudinal direction, the first duct comprising, in a radial direction, at least one first acoustically resistive layer, at least one first alveolar structure, as well as a first reflective layer, the second duct comprising, in a radial direction, at least one second acoustically resistive layer, at least one second alveolar structure, as well as one second reflective layer, the first and second ducts having aerodynamic surfaces, and being connected by a connection which comprises:
  a first flange which is positioned on a plane perpendicular to the longitudinal direction, having a free first edge and a second edge which is connected to the first reflective layer of the first duct;
  a second flange which is positioned on a plane perpendicular to the longitudinal direction, placed against the first flange, having a free first edge and a second edge which is connected to the second reflective layer of the second duct;
  connection elements which are oriented parallel to the longitudinal direction, passing through the first and second flanges, and maintaining them placed against one another.

According to the invention, for each of the first and second ducts, the first free edge of the first or second flange has a diameter which is smaller than that of its second edge. As a complement, the first and second ducts are configured to form at least one receptacle opening at the aerodynamic surfaces, and in which the first and second flanges as well as the connection elements are positioned. The connection also comprises at least one cap which is configured to close the receptacle, which cap is connected to the first or second duct, and has a surface flush with the aerodynamic surfaces of the first and second ducts.

This solution makes it possible to obtain a simple connection with connection elements which are accessible from the interior of the first and second ducts. Thus, when the first duct is connected to an air inlet of a nacelle, it can be assembled or dismantled without needing to provide movable cowls at the exterior wall of the nacelle in order to access the connection elements.

According to another characteristic, for each of the first and second ducts, the first or second alveolar structure is spaced from the first or second flange.

According to another characteristic, for each of the first and second ducts, the first or second reflective layer comprises a first or second cylindrical extension, which is oriented towards the rear or towards the front, and is connected to the first or second flange.

According to another characteristic, the first reflective layer comprises a first extension oriented towards the rear, having a first frusto-conical section which widens towards the rear, which section is connected to the first reflective layer, as well as a second frusto-conical section which connects the first frusto-conical section and the first flange. In parallel, the second reflective layer comprises a second extension oriented towards the front, having a first frusto-conical section which widens towards the front, which section is connected to the second reflective layer, as well as a second cylindrical section connecting the first frusto-conical section and the second flange.

According to another characteristic, the cap comprises a wall which has a first face flush with the aerodynamic surfaces, a second face opposite the first face, a front edge which is slightly spaced from the first acoustically resistive layer of the first duct, and/or a rear edge which is slightly spaced from the second acoustically resistive layer of the second duct.

According to another characteristic, the first acoustically resistive layer of the first duct comprises a rear extension which is offset relative to the aerodynamic surface of the first duct, against which the wall of the cap is placed and secured.

According to another characteristic, the second acoustically resistive layer of the second duct comprises a front extension which is offset relative to the aerodynamic surface of the second duct, against which the wall of the cap is placed and secured.

According to another characteristic, the connection comprises a first fastener in the form of a "Z", which has a first wing secured on the first or second reflective layer of the first or second duct, as well as a second wing which is offset relative to the aerodynamic surface of the first or second duct, against which the wall of the cap is placed and secured.

According to another characteristic, the connection comprises a second fastener in the form of an "L", which has a first wing connected to the first or second flange, as well as a second wing which is offset relative to the aerodynamic surface of the first or second duct, against which the wall of the cap is placed and secured.

According to another characteristic, the cap comprises a reflective layer and at least one alveolar structure which is added on against the second face of the wall of the cap, and is interposed between the wall and the reflective layer, the wall being porous and acoustically resistive at least in line with the alveolar structure.

The invention also relates to an aircraft comprising at least one nacelle according to one of the preceding characteristics.

BRIEF DESCRIPTION OF THE DRAWINGS

Other characteristics and advantages will become apparent from the following description of the invention, provided purely by way of example, with reference to the appended drawings, in which.

DETAILED DESCRIPTION OF THE PREFERRED EMBODIMENTS

Figure 4:
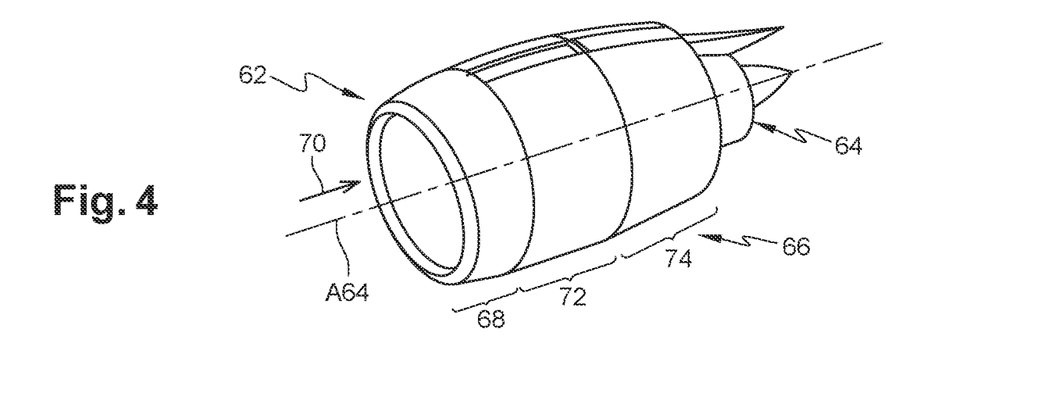
FIG. 4 is a view in perspective of a nacelle illustrating an embodiment of the invention.

According to an embodiment shown in FIG. 4, a propulsion assembly 62 comprises a turbojet engine 64 with an engine axis A64, parallel to the longitudinal direction and positioned in the interior of a nacelle 66. From the front towards the rear, the nacelle comprises a front part forming an air inlet 68, via which a flow of air 70 penetrates, an intermediate part 72, as well as a rear part 74 via which the flow of air 70 exits.

The rear part 74 can comprise a thrust inversion system.

Figure 5:
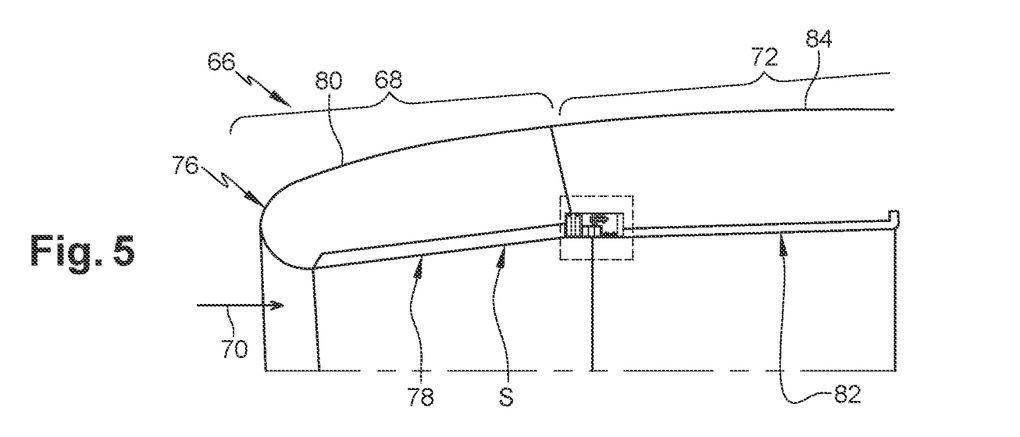
FIG. 5 is a longitudinal cross-section of part of a nacelle illustrating an embodiment of the invention.

According to an embodiment shown in FIG. 5, the air inlet 68 comprises a lip 76, a first duct 78 extending the lip 76 towards the interior of the nacelle 66, as well as an exterior wall 80 extending the lip 76 towards the exterior of the nacelle 66. The first duct 78 is configured to channel the flow of air 70 in the direction of the turbojet engine 64, and has a first axis parallel to the longitudinal direction, as well as an aerodynamic surface S against which the flow of air 70 flows.

In the interior, the intermediate part 72 comprises a second duct 82, known as the fan case, extending the first duct 78 and forming a retention housing which is configured to retain pieces of blade in the case of blade breakage. On the exterior, the intermediate part 72 comprises a fairing 84 which is positioned in the extension of the exterior wall 80.

Contrary to the prior art, this fairing 84 can be fixed and not comprise a cowl. The second duct 82 has a second axis parallel to the longitudinal direction, and an aerodynamic surface against which the flow of air 70 flows.

The first duct 78 is delimited by at least one acoustic panel, and, in the radial direction, going away from the engine axis A64, it comprises a first acoustically resistive layer 86, at least one first alveolar structure 88, and a first reflective layer 90. Similarly, the second duct 82 is delimited by at least one acoustic panel, and, in the radial direction, going away from the engine axis A64, it comprises a second acoustically resistive layer 92, at least one second alveolar structure 94, and a second reflective layer 96.

The first and second acoustically resistive layers 86, 92 have surfaces in contact with the flow of air 70 which form the aerodynamic surfaces S of the first and second ducts 78, 82.

The nacelle 66 comprises a connection 98 connecting the first and second ducts 78, 82, comprising a first flange 100 which is integral with the first reflective layer 90, a second flange 102 which is integral with the second reflective layer 96, placed against the first flange 100, as well as connection elements 104 passing through the first and second flanges 100, 102 and maintaining them placed against one another.

The first and second flanges 100, 102 are positioned on transverse planes (perpendicular to the engine axis A64). The connection elements 104 are distributed on the circumference of the first and second flanges 100, 102, and are oriented parallel to the longitudinal direction (parallel to the engine axis A64). Each connection element 104 comprises a cylindrical rod 104.1 with an axis parallel to the longitudinal direction, a first stop 104.2 (such as a head of a screw, for example) at a first end of the cylindrical rod 104.1, as well as a second stop 104.3 (such as a nut, for example) at a second end of the cylindrical rod 104.1. The connection elements 104 are not described further since they can be identical to those of the prior art.

The first flange 100 comprises a first free edge 100.1, as well as a second edge 100.2 which is connected to the first reflective layer 90. The first free edge 100.1 has a diameter which is smaller than that of the second edge 100.2. Thus, the first flange 100 is known as being interior, and is oriented towards the engine axis A64. Similarly, the second flange 102 comprises a first free edge 102.1, as well as a second edge 102.2 which is connected to the second reflective layer 96. The first free edge 102.1 has a diameter which is smaller than that of the second edge 102.2. Thus, the second flange 102 is known as being interior, and is oriented towards the engine axis A64.

According to one configuration, the first free edges 100.1, 102.1 of the first and second flanges 100, 102 have the same diameter. The second edges 100.2, 102.2 of the first and second flanges 100, 102 also have the same diameter.

According to this arrangement, the connection elements 104 are accessible from the interior of the first and second ducts 78, 82.

According to one configuration, the first flange 100 is spaced from the first alveolar structure 88 in order to make it possible to access the first or second stops 104.2, 104.3 of the connection elements 104. In parallel, the second flange 102 is spaced from the second alveolar structure 94 in order to make it possible to access the first or second stops 104.2, 104.3 of the connection elements 104.

Figure 6:
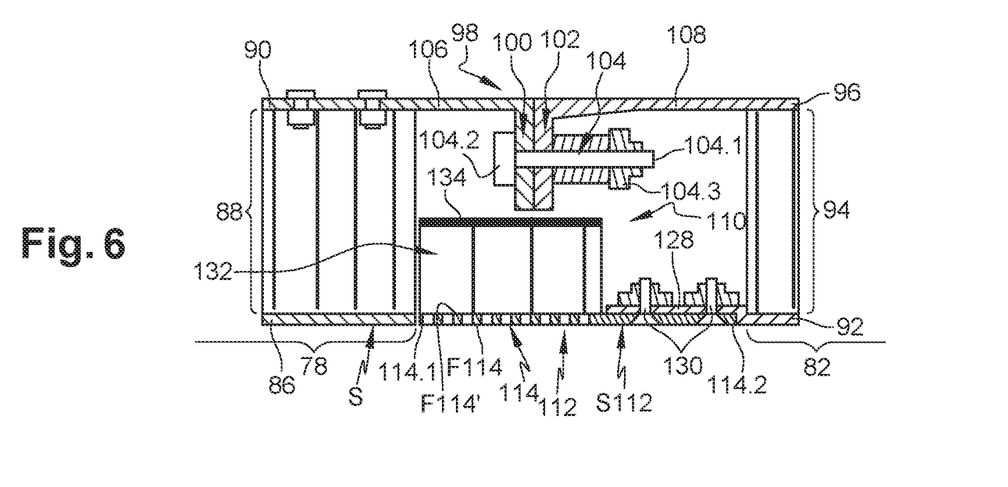
FIG. 6 is a longitudinal cross-section of a connection connecting the first and second ducts of a nacelle illustrating an embodiment of the invention.
Figure 9:
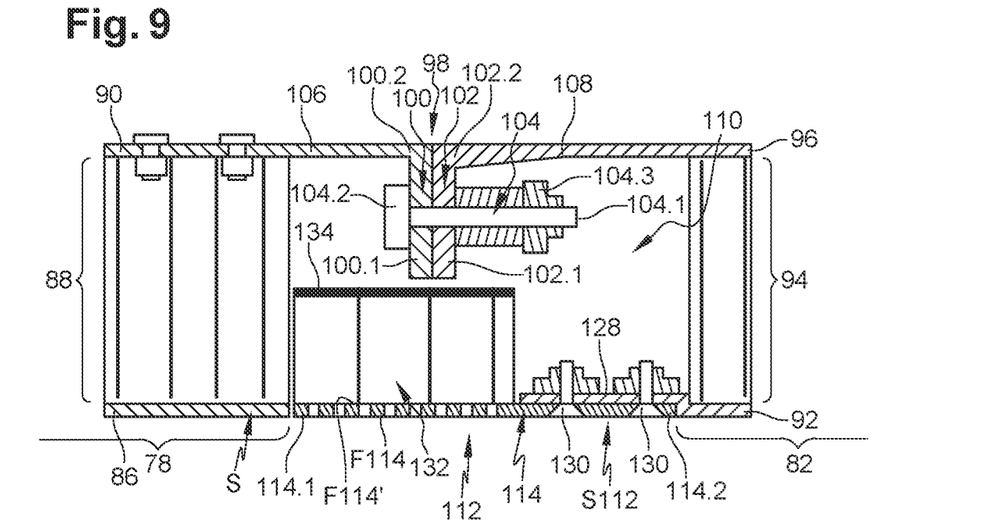
FIG. 9 is a longitudinal cross-section of a connection connecting the first and second ducts of a nacelle illustrating another embodiment of the invention.
Figure 11:
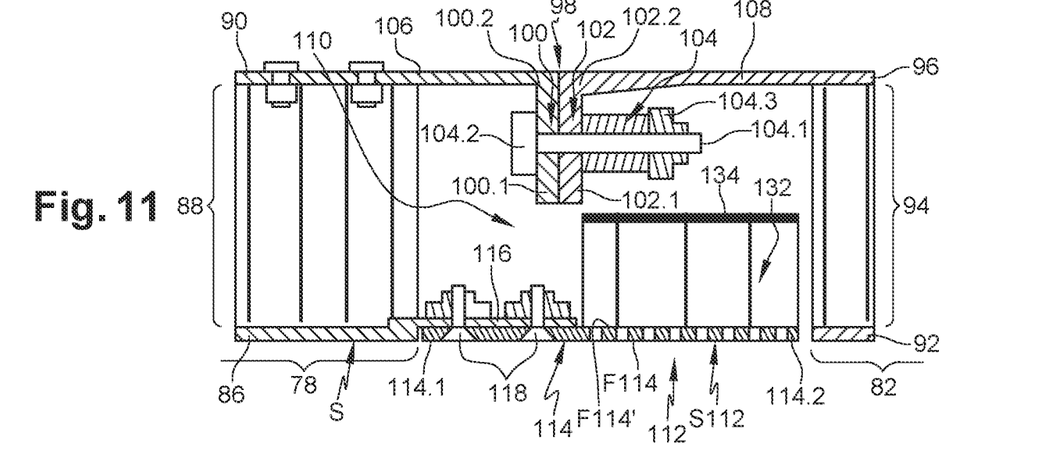
FIG. 11 is a longitudinal cross-section of a connection connecting the first and second ducts of a nacelle illustrating another embodiment of the invention.

According to embodiments shown in FIGS. 6, 9 and 11, the first reflective layer 90 comprises a first cylindrical extension 106, which is oriented towards the rear, and is connected to the first flange 100. In parallel, the second reflective layer 96 comprises a second cylindrical extension 108, which is oriented towards the front, and is connected to the second flange 102.

Figure 7:
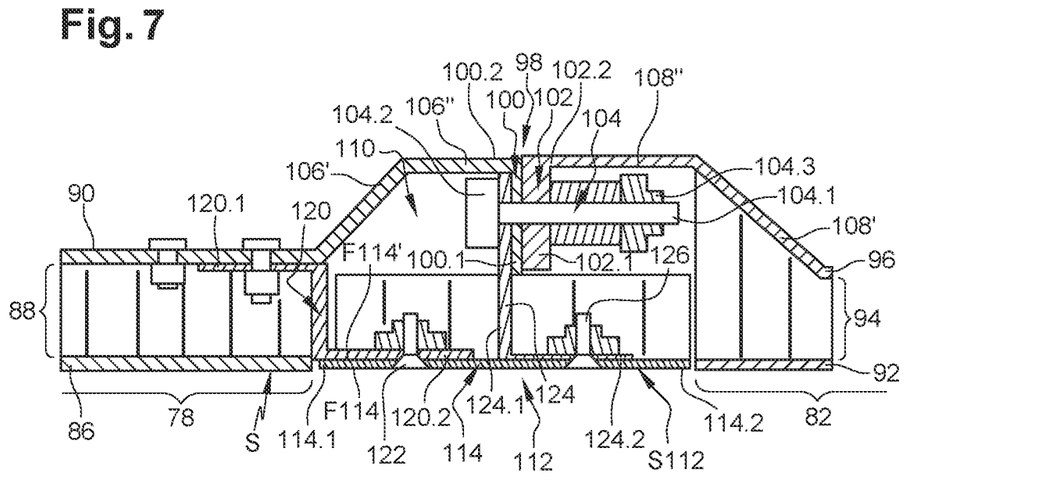
FIG. 7 is a longitudinal cross-section of a connection connecting the first and second ducts of a nacelle illustrating another embodiment of the invention.
Figure 8:
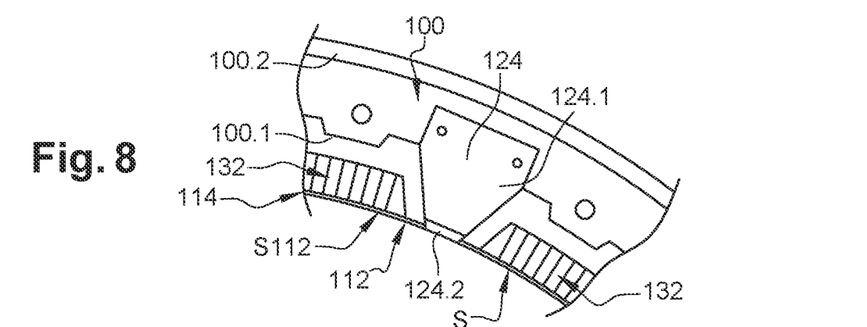
FIG. 8 is a view from the front of part of the connection shown in FIG. 7.
Figure 10:
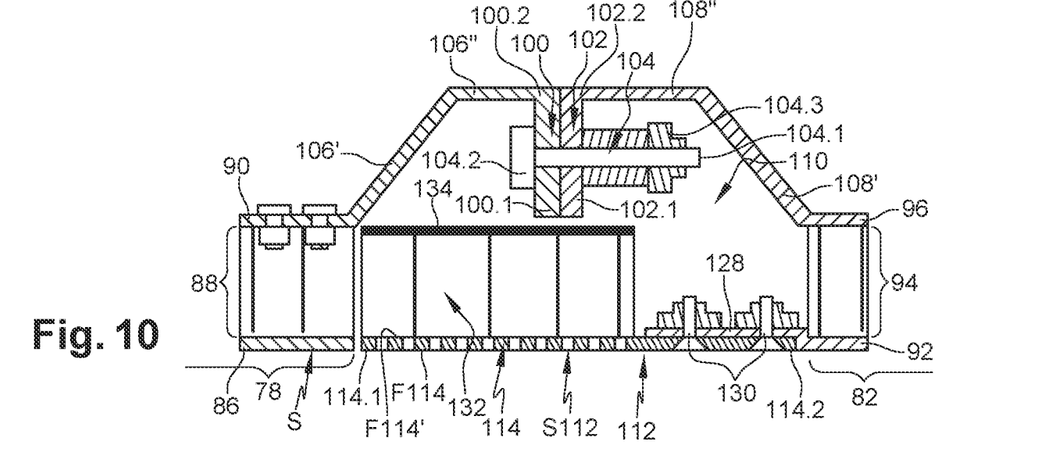
FIG. 10 is a longitudinal cross-section of a connection connecting the first and second ducts of a nacelle illustrating another embodiment of the invention.
Figure 12:
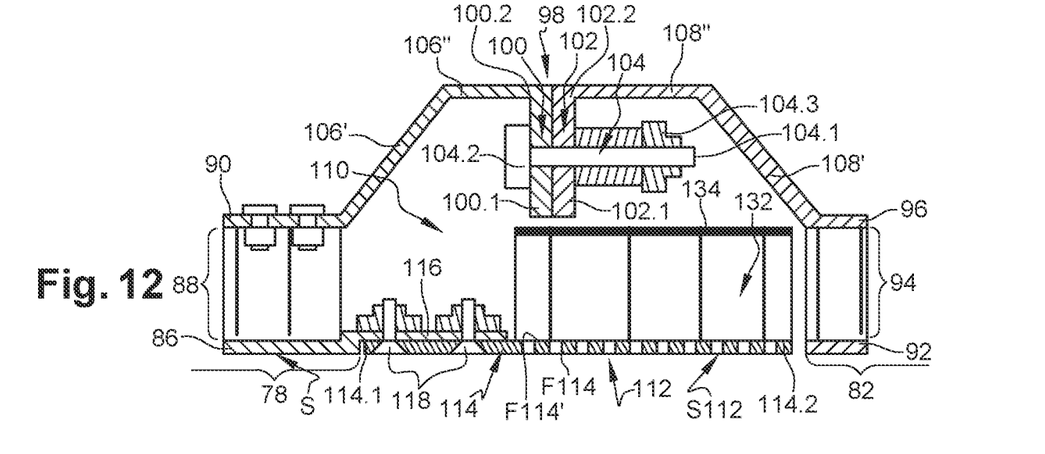
FIG. 12 is a longitudinal cross-section of a connection connecting the first and second ducts of a nacelle illustrating another embodiment of the invention.

According to embodiments shown in FIGS. 7, 10 and 12, the first reflective layer 90 comprises a first extension which is oriented towards the rear, with a first frusto-conical section 106' which widens towards the rear, and is connected to the first reflective layer 90, as well as a second cylindrical section 106" connecting the first frusto-conical section 106' and the first flange 100. In parallel, the second reflective layer 96 comprises a second extension, which is oriented towards the front, having a first frusto-conical section 108' which widens towards the front, and is connected to the second reflective layer 96, as well as a second cylindrical section 108" connecting the first frusto-conical section 108' and the second flange 102. In the presence of frusto-conical sections, as illustrated in FIGS. 7, 10 and 12, the first and second flanges 101 and 102 are spaced further from the aerodynamic surface S than in the embodiments shown in FIGS. 6, 9 and 11.

Irrespective of the embodiment, the first and second ducts 78, 82 are configured to form at least one receptacle 110 which opens at the aerodynamic surfaces S, and in which there are positioned the first and second flanges 100, 102, as well as the connection elements 104. This receptacle 110 extends over the entire circumference of the first and second ducts 78, 82.

The connection 98 comprises at least one cap 112 which is configured to close the receptacle 110, it is connected to the first or the second duct 78, 82, and has a surface S112 which is flush with the aerodynamic surface S of the first and second ducts 78, 82.

The cap 112 comprises a curved wall 114 following the curvature of the first and second ducts 78, 82. This wall 114 has a first face F114 which is oriented towards the engine axis A64, corresponding to the surface S112 of the cap 112 which is flush with the aerodynamic surfaces S, as well as a second face F114' opposite the first face F114. This wall 114 comprises a front edge 114.1, which is slightly spaced from the acoustically resistive first layer 86 of the first duct 78, and/or a rear edge 114.2, which is slightly spaced from the second acoustically resistive layer 92 of the second duct 82. It is considered that two elements are slightly spaced if the distance separating them is less than 20 mm, and preferably less than 10 mm.

According to embodiments shown in FIGS. 7, 11 and 12, the cap 112 is connected to the first duct 78.

According to embodiments shown in FIGS. 11 and 12, the acoustically resistive layer 86 of the first duct 78 comprises a rear extension 116 which is offset relative to the aerodynamic surface S against which the second face F114' of the wall 114 of the cap 112 is placed, the wall 114 being secured on the rear extension 116 by flush screws 118 and rivet nuts or any other connection element.

According to another embodiment shown in FIG. 7, the connection 98 comprises a first fastener 120 in the form of a "Z", which has a first wing 120.1 secured on the reflective layer 90 of the first duct 78, as well as a second wing 120.2, which is offset relative to the aerodynamic surface S against which the second face F114' of the wall 114 of the cap 112 is placed, the wall 114 being secured on the second wing 120.2 by flush screws 122 and rivet nuts or any other connection element. As a complement, the connection 98 comprises a second fastener 124 in the form of an "L", which has a first wing 124.1 connected to the first flange 100, as well as a second wing 124.2, which is offset relative to the aerodynamic surface S against which the second face F114' of the wall 114 of the cap 112 is placed, the wall 114 being secured on the second wing 124.2 by flush screws 126 and rivet nuts or any other connection element. As illustrated in FIG. 7, the connection 98 can comprise first and second fasteners 120, 124, only first fasteners 120, or only second fasteners 124. As a variant, the first fastener 120 in the form of a "Z" could be secured on the second reflective layer 96 of the second duct 82, and/or the second fastener 124 in the form of an "L" could be connected to the second flange 102.

According to embodiments shown in FIGS. 6, 9, 10, the cap 112 is connected to the second duct 82. According to one configuration, the second acoustically resistive layer 92 of the second duct 82 comprises a front extension 128 which is offset relative to the aerodynamic surface S against which the second face F114' of the wall 114 of the cap 112 is placed, the wall 114 being secured on the front extension 128 by flush screws 130 and rivet nuts or any other connection element.

It will be appreciated that the invention is not limited to these embodiments for the connection between the cap 112 and the first or second duct 78, 82.

According to different embodiments, the cap 112 comprises at least one alveolar structure 132 which is added on against the wall 114, and more particularly against the second face F114' of the wall 114. This alveolar structure 132 can cover all of the second face F114', as illustrated in FIG. 7, or only the areas of the second face F114' which are not covered by the front or rear extensions 116, 128, as illustrated in FIGS. 6, and 9 to 12.

According to certain embodiments, the wall 114 is porous and acoustically resistive. According to these embodiments, the wall 114 is porous and acoustically resistive at least in line with the alveolar structure 132, this structure being interposed between the acoustically porous wall 114 and a reflective layer 134. Thus, the acoustically resistive wall 114, the alveolar structure 132 and the reflective layer 134 form an acoustic panel contributing to the attenuation of the soundwaves.

It will be appreciated that the invention is not limited to the embodiments previously described for the cap 112, which can be composed of a simple metal plate, a plate made of composite material, or any other suitable material. According to these last embodiments, the cap 112 does not have acoustic characteristics.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising:
   first and second ducts, having first and second axes parallel to a longitudinal direction, the first duct comprising, in a radial direction,
      at least one first acoustically resistive layer,
      at least one first alveolar structure, and
      a first reflective layer,
   the second duct comprising, in a radial direction,
      at least one second acoustically resistive layer,
      at least one second alveolar structure, and
      a second reflective layer, the first and second ducts having aerodynamic surfaces, and being connected by a connection which comprises:
         a first flange which is positioned on a plane perpendicular to the longitudinal direction, having a free first edge and a second edge which is connected to the first reflective layer of the first duct;
         a second flange which is positioned on a plane perpendicular to the longitudinal direction, placed against the first flange, having a free first edge and a second edge which is connected to the second reflective layer of the second duct; and
         connection elements which are oriented parallel to the longitudinal direction, passing through the first and second flanges, and maintaining them placed against one another,
   wherein, for each of the first and second ducts, the first free edge of the first or second flange has a diameter which is smaller than that of its second edge,
   wherein the first and second ducts are configured to form at least one receptacle opening at the aerodynamic surfaces, in which the first and second flanges as well as the connection elements, are positioned,
   wherein the connection comprises at least one cap which is configured to close the at least one receptacle, wherein the at least one cap is connected to the first or second duct, and has a surface flush with the aerodynamic surfaces of the first and second ducts, and
   wherein the connection is positioned between the acoustically resistive layers and the reflective layers.

2. The aircraft nacelle as claimed in claim 1, wherein, for each of the first and second ducts, the first or second alveolar structure is spaced from the first or second flange.

3. The aircraft nacelle as claimed in claim 1, wherein, for each of the first and second ducts, the first or second reflective layer comprises a first or second cylindrical extension, which is oriented towards the rear or towards the front, and is connected to the first or second flange.

4. The aircraft nacelle as claimed in claim 1,
   wherein the first reflective layer comprises a first extension oriented towards the rear, having a first frusto-conical section which widens towards the rear, wherein the frusto-conical section of the first reflective layer is connected to the first reflective layer, as well as a second frusto-conical section which connects the first frusto-conical section and the first flange, and
   wherein the second reflective layer comprises a second extension oriented towards the front, having a first frusto-conical section which widens towards the front, wherein the frusto-conical section of the second reflective layer is connected to the second reflective layer, as well as a second cylindrical section connecting the first frusto-conical section and the second flange.

5. The aircraft nacelle as claimed in claim 1, wherein the at least one cap comprises:
   a wall which has a first face flush with the aerodynamic surfaces,
   a second face opposite the first face, and at least one of:
      a front edge which is slightly spaced from the first acoustically resistive layer of the first duct, or
      a rear edge which is slightly spaced from the second acoustically resistive layer of the second duct.

6. The aircraft nacelle as claimed in claim 5, wherein the first acoustically resistive layer of the first duct comprises a rear extension which is offset relative to the aerodynamic surface of the first duct, against which the wall of the cap is placed and secured.

7. The aircraft nacelle as claimed in claim 5, wherein the second acoustically resistive layer of the second duct comprises a front extension which is offset relative to the aerodynamic surface of the second duct, against which the wall of the cap is placed and secured.

8. The aircraft nacelle as claimed in claim 5, wherein the connection comprises a first fastener in the form of a "Z", which has a first wing secured on the first or second reflective layer of the first or second duct, as well as a second wing which is offset relative to the aerodynamic surface of the first or second duct, against which the wall of the cap is placed and secured.

9. The aircraft nacelle as claimed in claim 8, wherein the connection comprises a second fastener in the form of an "L", which has a first wing connected to the first or second flange, as well as a second wing which is offset relative to the aerodynamic surface of the first or second duct, against which the wall of the cap is placed and secured.

10. The aircraft nacelle as claimed in claim 5, wherein the at least one cap comprises a reflective layer and at least one alveolar structure which is added on against the second face of the wall and is interposed between said wall and the reflective layer of the at least one cap, said wall being porous and acoustically resistive at least in line with the at least one alveolar structure of the at least one cap.

11. An aircraft comprising at least one nacelle as claimed in claim 1.

12. An aircraft nacelle comprising:
first and second ducts, having first and second axes parallel to a longitudinal direction, the first duct comprising, in a radial direction,
at least one first acoustically resistive layer,
at least one first alveolar structure, and
a first reflective layer,
the second duct comprising, in a radial direction,
at least one second acoustically resistive layer,
at least one second alveolar structure, and
a second reflective layer, the first and second ducts having aerodynamic surfaces, and being connected by a connection which comprises:
a first flange which is positioned on a plane perpendicular to the longitudinal direction, having a free first edge and a second edge which is connected to the first reflective layer of the first duct;
a second flange which is positioned on a plane perpendicular to the longitudinal direction, placed against the first flange, having a free first edge and a second edge which is connected to the second reflective layer of the second duct; and
connection elements which are oriented parallel to the longitudinal direction, passing through the first and second flanges, and maintaining them placed against one another,
wherein, for each of the first and second ducts, the first free edge of the first or second flange has a diameter which is smaller than that of its second edge,
wherein the first and second ducts are configured to form at least one receptacle opening at the aerodynamic surfaces, in which the first and second flanges as well as the connection elements, are positioned, and
wherein the connection comprises at least one cap which is configured to close the at least one receptacle, wherein the at least one cap is connected to the first or second duct, and has a surface flush with the aerodynamic surfaces of the first and second ducts,
wherein the at least one cap comprises:
a wall which has a first face flush with the aerodynamic surfaces,
a second face opposite the first face, and at least one of:
a front edge which is slightly spaced from the first acoustically resistive layer of the first duct, or
a rear edge which is slightly spaced from the second acoustically resistive layer of the second duct.

13. The aircraft nacelle as claimed in claim 12, wherein the first acoustically resistive layer of the first duct comprises a rear extension which is offset relative to the aerodynamic surface of the first duct, against which the wall of the cap is placed and secured.

14. The aircraft nacelle as claimed in claim 12, wherein the second acoustically resistive layer of the second duct comprises a front extension which is offset relative to the aerodynamic surface of the second duct, against which the wall of the cap is placed and secured.

15. The aircraft nacelle as claimed in claim 12, wherein the connection comprises a first fastener in the form of a "Z", which has a first wing secured on the first or second reflective layer of the first or second duct, as well as a second wing which is offset relative to the aerodynamic surface of the first or second duct, against which the wall of the cap is placed and secured.

16. The aircraft nacelle as claimed in claim 15, wherein the connection comprises a second fastener in the form of an "L", which has a first wing connected to the first or second flange, as well as a second wing which is offset relative to the aerodynamic surface of the first or second duct, against which the wall of the cap is placed and secured.

17. The aircraft nacelle as claimed in claim 12, wherein the at least one cap comprises a reflective layer and at least one alveolar structure which is added on against the second face of the wall and is interposed between said wall and the reflective layer of the at least one cap, said wall being porous and acoustically resistive at least in line with the at least one alveolar structure of the at least one cap.

* * * * *